Patented Oct. 2, 1928.                                     1,685,966

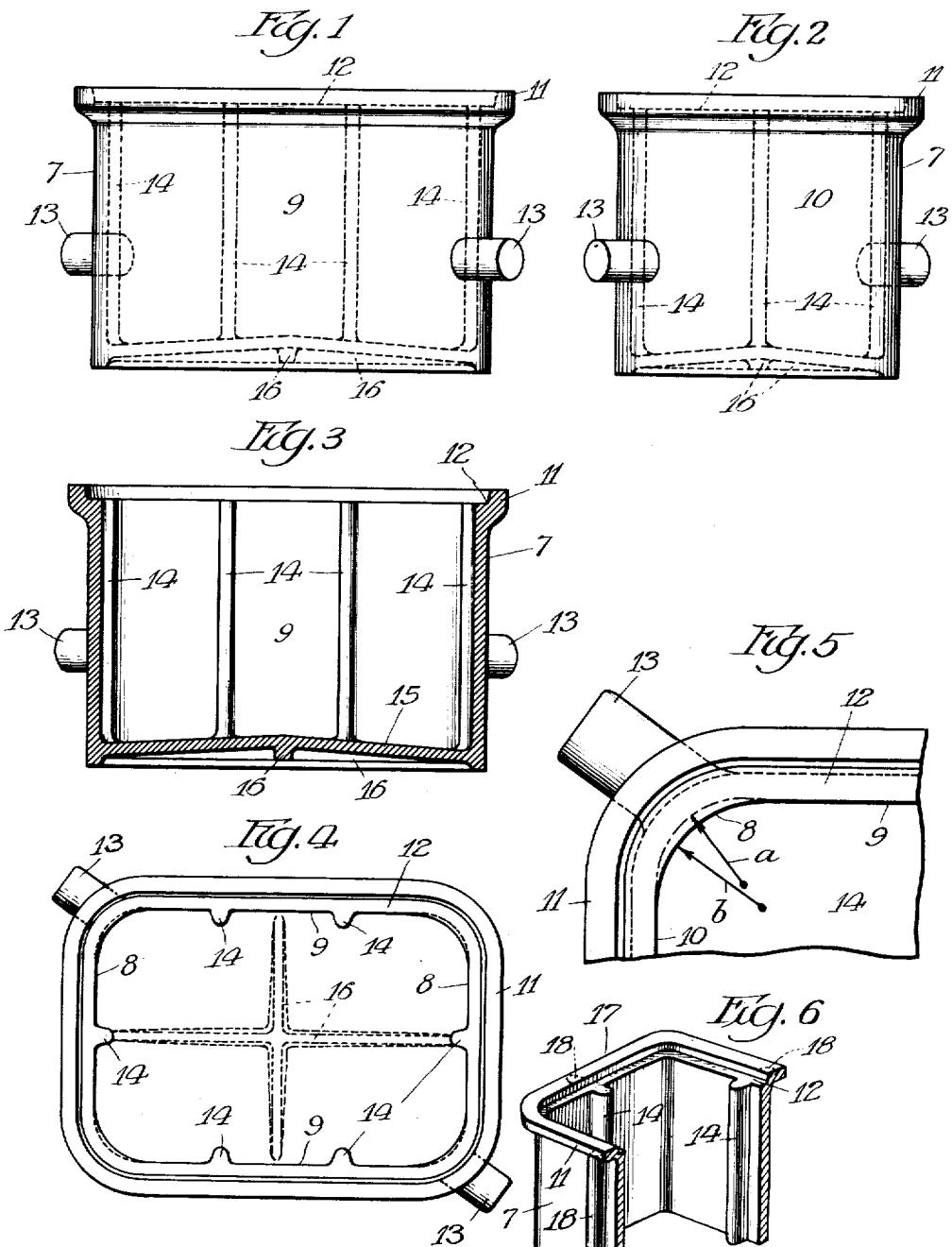

UNITED STATES PATENT OFFICE.

ROBERT S. STEWART, OF CHICAGO, ILLINOIS, ASSIGNOR TO THE AMERICAN BRAKE SHOE & FOUNDRY COMPANY, OF NEW YORK, N. Y., A CORPORATION OF DELAWARE.

ANNEALING POT.

Application filed September 30, 1927. Serial No. 222,994.

This invention relates to annealing pots and it has for its object to prolong the life of the pot and to prevent it from cracking at the corners in the strains of expansion and contraction due to heating and cooling.

A further object of the invention is to increase the area of the bearing seat on the pot so that they may be stacked more substantially and safely and particularly to accommodate warped pots.

And a further object of the invention is to reinforce and strengthen the walls of the pot to prolong the life of the pot and maintain it in serviceable condition.

I have illustrated the invention in a selected embodiment in the accompanying drawings in which, Fig. 1 is a side elevation and Fig. 2 is an end elevation of a closed bottom pot embodying the invention.

Fig. 3 is a longitudinal sectional view of the pot shown in Figs. 1 and 2.

Fig. 4 is a top plan view of the pot shown in Figs. 1–3.

Fig. 5 is a detail enlarged view of one corner of the pot.

Fig. 6 is a detail perspective view of one end of the open bottom pot embodying the invention.

Referring to Figs. 1–5 of the drawings the pot 7 is substantially rectangular in shape with rounded corners and each corner is reinforced with excess metal 8 inside of the pot. This excess metal is crescent shaped, it is thickest at its perpendicular center line and it tapers to and fades off in the side wall 9 and end wall 10 of the pot, Fig. 5. In this figure I have indicated by an indication line and the arrow $a$ what would be the radius of the inside of the corner concentric with the radius of the ouside of the corner. I have also indicated by the arrow $b$ the true radius of the inside corner.

In practical use annealing pots generally fail first at the corners which crack from the expansion and contraction strains due to heating and cooling. Also, the corners wear more rapidly than the walls of the pot because the flames strike the corners more severely than the walls. Cracked pots will no longer protect the castings contained in the pots from oxidizing while being annealed. I have found in practical experience that cracking at the corners of the pots is prevented and the life of the pots is greatly prolonged when they are provided with the crescent shape excess of metal at the inside of each corner. I have also found that the pot may be thus reinforced on the inside with entirely satisfactory results and the life of the pot is greatly prolonged. If the excess metal is placed on the outside of the corners they form a greater obstruction to the flames and heat and appear to be subjected to more severe action by the flames and heat and wear off rapidly. Also, if excess metal is provided on the outside of the corners, it has been found that the corners appear to be more liable to crack due to too much metal being concentrated at one point. But I do not experience these difficulties and disadvantages when the excess reinforcing metal is provided on the inside of the corner in what I call a "compensated radius" indicated by the arrow $b$ in Fig. 5. This reinforcement not only takes care of the oxidation wear which occurs more rapidly at the corners than elsewhere on the pot, but it also protects the pot from cracking under the strains of expansion and contraction which occur at the corners of the pot.

The top of the pot is flared at 11 and is provided interiorly with a shoulder seat 12 to receive the bottom of another pot when they are stacked one upon the other. The pots may also be provided with trunnions 13 at opposite corners for convenience in handling.

I also provide the pots with one or more ribs 14 on the inside of the sides and ends and extending from top to bottom of the pot. These ribs reinforce and strengthen the sides and ends of the pot, reduce distortion to a minimum and assist in prolonging the life of the pot. The ribs are preferably located on the inside of the walls of the pot where they will not be subjected to oxidation and will continue effective until the pot is worn out. The walls of the pot oxidize and wear on the outside, gradually becoming weaker in use, and since the reinforcing and strengthening ribs are on the inside of the pot where they do not oxidize and wear like the outside of the walls of the pot, they will continue to form a substantial reinforcement for the pot as long as it can be used.

The upper end of the ribs 14 materially enlarge the seat in the upper end of the pot and compensate for any warpage or other distortion of the walls of the pot so they will always be effective for stacking. The pot has a bottom 15 which may be slightly crowned at the center and provided on its outer side with crossed strengthening ribs 16.

In Fig. 6 I have shown an open bottom pot 17 with the compensated corner radius and the inside ribs, as shown in Figs. 1 to 5. I may also provide the open bottom pot with ribs 18 suitably disposed on the outside of and extending from the top to the bottom of the walls of the pot, and these outside ribs may also be used on closed bottom pots. Either the ribs 14 or the ribs 18 or both may be used on round pots or pots of other shapes.

Other changes in the form, construction and arrangement of parts of my invention may be made within the scope of the following claims.

I claim:
1. An annealing pot having an excess of metal on the inside of each corner to reinforce and strengthen the corner and to compensate for oxidation and wear on the outside of the corner of the pot.

2. An annealing pot having an excess of metal on the inside of each corner in crescent form with a compensated radius of greater angle than the radius of the outside of the corner to reinforce and strengthen the corner and compensate for oxidation and wear on the outside of the corner.

3. An annealing pot having an excess of metal on the inside of each corner, a plurality of vertically disposed ribs on the inside of the walls of the pot, and a plurality of vertically disposed ribs on the outside of the walls of the pot.

ROBERT S. STEWART.

DISCLAIMER 1,685,966.—*Robert S. Stewart*, Chicago, Ill. ANNEALING POT. Patent dated October 2, 1928. Disclaimer filed November 29, 1937, by the assignee, *The American Brake Shoe and Foundry Company*.

Hereby disclaims from the scope of claim 1 each and every annealing pot which is not cast and therefore not integral and wherein the excess of metal at each corner of the pot is not confined to the inside of each such corner.

[*Official Gazette December 28, 1937.*]

has a bottom 15 which may be slightly crowned at the center and provided on its outer side with crossed strengthening ribs 16.

In Fig. 6 I have shown an open bottom pot 17 with the compensated corner radius and the inside ribs, as shown in Figs. 1 to 5. I may also provide the open bottom pot with ribs 18 suitably disposed on the outside of and extending from the top to the bottom of the walls of the pot, and these outside ribs may also be used on closed bottom pots. Either the ribs 14 or the ribs 18 or both may be used on round pots or pots of other shapes.

Other changes in the form, construction and arrangement of parts of my invention may be made within the scope of the following claims.

I claim:

1. An annealing pot having an excess of metal on the inside of each corner to reinforce and strengthen the corner and to compensate for oxidation and wear on the outside of the corner of the pot.

2. An annealing pot having an excess of metal on the inside of each corner in crescent form with a compensated radius of greater angle than the radius of the outside of the corner to reinforce and strengthen the corner and compensate for oxidation and wear on the outside of the corner.

3. An annealing pot having an excess of metal on the inside of each corner, a plurality of vertically disposed ribs on the inside of the walls of the pot, and a plurality of vertically disposed ribs on the outside of the walls of the pot.

ROBERT S. STEWART.

DISCLAIMER 1,685,966.—*Robert S. Stewart*, Chicago, Ill. ANNEALING POT. Patent dated October 2, 1928. Disclaimer filed November 29, 1937, by the assignee, *The American Brake Shoe and Foundry Company*.

Hereby disclaims from the scope of claim 1 each and every annealing pot which is not cast and therefore not integral and wherein the excess of metal at each corner of the pot is not confined to the inside of each such corner.

[*Official Gazette December 28, 1937.*]